United States Patent Office 3,364,136
Patented Jan. 16, 1968

3,364,136
NOVEL CYCLIC CATALYTIC PROCESS FOR THE CONVERSION OF HYDROCARBONS
Nai Ynen Chen, Cherry Hill, N.J., and Paul B. Weisz, Media, Pa., assignors to Mobil Oil Corporation, a corporation of New York
No Drawing. Filed Dec. 10, 1965, Ser. No. 513,063
5 Claims. (Cl. 208—120)

This invention relates to a novel process for the catalytic conversion of organic compounds and, more particularly, to an improved process for the conversion of hydrocarbons by contact with a solid catalyst followed by regeneration of the catalyst by burning.

As is well known, cyclic catalytic operations generally involve contacting an organic charge stock with a suitable catalyst under appropriate conditions of temperature, pressure, etc., until the selectivity and/or activity of the catalyst becomes impaired due to deposition of a carbonaceous deposit commonly referred to as "coke." The activity of the catalyst is then restored by burning off the coke in a regeneration stage. Large amounts of heat are released during this regeneration and precautions must be taken to prevent excessively high temperatures which would damage the apparatus or the catalyst. It has therefore become necessary to construct the regenerator or kiln so that it will be able to handle a certain predetermined amount of coke per unit of time. In the vast majority of cyclic catalytic operations, i.e., catalytic cracking, the regenerator is usually the limiting factor and is capable of operation only within certain definite limits.

The successful operation of a cyclic catalytic process becomes further complicated due to the tendency of the gases formed in the regenerator to burn in an uncontrolled manner. As can well be appreciated, the oxidation of the carbonaceous material deposited on the catalyst can form both carbon monoxide and carbon dioxide and it would appear that in situations wherein the ratio of carbon dioxide to carbon monoxide is low, the excess carbon monoxide undergoes combustion which results in an uncontrolled rise in temperature within the flues until ignition temperatures are reached. This ignition of gaseous material in the flues, commonly referred to as afterburning, results not only in severe damage to the equipment itself, due to the fact that the flues are not designed to withstand this excess heat, but also can cause significant damage to the conversion catalyst due to the inordinate rise in temperature.

There have been many proposals heretofore suggested to the art in an attempt to minimize the dangers presented by after-burning, but they have not been completely successful. It has been suggested to maintain regeneration temperatures at a sufficiently low level so that afterburning will not occur, but this has resulted in operation of the regenerator or kilns at a capacity less than maximum, thereby detracting from the overall economy of the operation. It has also been proposed to incorporate certain materials in the conversion catalysts specifically intended to favor the formation of carbon dioxide at the expense of carbon monoxide during the regeneration cycle. However, the materials heretofore suggested, although exercising control of the $CO_2/CO$ ratio, did in fact influence the main conversion reaction taking place to such an extent that their concentration in the catalyst system had to be kept extremely low. Thus, for example, in the catalytic cracking of gas oil to produce gasoline, the incorporation of chromic oxide into a cracking catalyst does in fact favorably increase the ratio of carbon dioxide to carbon monoxide formed during the regeneration cycle. However, chromic oxide is a hydrogenation-dehydrogenation catalyst and too high a concentration of this material in the conversion zone would actually increase the amount of coke which is formed, thereby compounding the problem of coke removal in the regeneration cycle and producing losses in cracking selectivity. This method of modifying the $CO_2/CO$ ratio has therefore remained at best a compromise between obtaining some benefit towards more $CO_2$ production by an oxidation additive on one hand, and minimizing the loss in cracking selectivity due to the additive, on the other hand.

Aside from the importance of controlling the $CO_2/CO$ ratio for purposes of control of the after burning phenomenon, this ratio also affects the amount of heat released by the coke burning operation for a given amount of carbon burned. Since this heat is an integral factor in the operability of a heat balanced cyclic cracking operation, it follows that provisions for flexibly altering the $CO_2/CO$ ratio would advance the ability of controlling operations of such units.

This invention is directed towards an improvement for carrying out cyclic catalytic conversion processes free of the undersirable problems heretofore encountered in the art. The process of this invention will make it possible to obtain an accurate control of the carbon dioxide to carbon monoxide ratio in the regeneration zone without influencing the main conversion reaction taking place.

This invention is based upon using certain crystalline aluminosilicate materials of very well defined intracrystalline dimensions which have the ability, by reason of their dimensions, to allow the passage into or out of their crystalline cavities of only certain molecules, that is, of molecules having particular shape or size. By associating catalytic activity within the intracrystalline spaces for the particular chemical reaction system which is to be catalyzed, only such conversion paths are obtained which involve reactant or product molecules of such specific shapes or sizes. Thus, this invention utilizes a shape-selective crystalline aluminosilicate having a pore size sufficiently large to admit into the internal pore thereof carbon dioxide, carbon monoxide and oxygen, but sufficiently small so as to substantially exclude organic compounds and particularly hydrocarbons of a petroleum charge stock. Catalysts for the oxidation of carbon monoxide to carbon dioxide are associated within the pores of the shape-selective aluminosilicate so that the catalyst can preferentially act upon the carbon monoxide from a mixture of the same with organic compounds. This catalyst-containing shape-selective aluminosilicate is then combined with any suitable conversion catalyst.

Thus, the novel process of this invention is based upon using a catalyst system containing at least two components wherein one component is a conversion catalyst which can catalyze the conversion of a carbonaceous charge stock desired to be acted upon, such as a petroleum charge stock, and the second component will catalyze the oxidation of carbon monoxide to carbon dioxide but be substantially catalytically inert to the organic compounds present in the carbonaceous charge stock. While not wishing to be bound by any theory of operation, it nevertheless appears that in order to adequately provide any kind of catalytic action on a particular species when employing a solid catalyst that species must be able to enter within the internal pore structure of the solid catalyst. Therefore, it becomes advantageous to employ a shape-selective aluminosilicate wherein only carbon monoxide, carbon dioxide and oxygen will be selectively admitted into the internal pore structure thereof from mixtures of these gases with organic compounds and be acted upon by the catalyst contained in the pores. Therefore, the heart of the invention involves utilizing a catalyst system comprising two components, one being able to exert general conversion activity and the other, because of its restricted pore size, being substantially inert with respect to all activity with the exception of the conversion of carbon monoxide to carbon dioxide.

It can be seen that the novel process of this invention provides a very effective way to control the ratio of carbon dioxide to carbon monoxide in the regeneration zone without influencing the main conversion reaction taking place since the substances which catalyze the formation of carbon dioxide are contained within the pores of an aluminosilicate of such a size that organic compounds cannot enter therein or be acted upon.

The aluminosilicates which are operable in the novel process of this invention are those materials which have pore sizes sufficiently large to admit oxygen, carbon monoxide and carbon dioxide into the internal pore structure thereof, yet sufficiently small to substantially exclude organic compounds from entering therein. However, it is to be understood that in most commercially important processes, i.e., catalytic cracking, the presence of n-paraffins having less than four carbon atoms is relatively slight so that this invention would include, in its broadest application, the use of shape-selective aluminosilicates having a pore size sufficiently large to admit carbon dioxide, carbon monoxide and oxygen and sufficiently small to substantially exclude all n-paraffins having more than 3 carbon atoms in their molecules, i.e., n-butane and higher paraffins.

Aluminosilicates which meet the above definition are those materials having a pore size between about 3 and less than about 5 Angstrom units. For purposes of this invention the expression "pore size" as used herein in connection with the aluminosilicates refers to the apparent pore size as distinguished from the crystallographic pore diameter. The apparent pore size may be defined as the maximum critical dimension of the molecular species which is adsorbed by the aluminosilicate in question under normal conditions. Maximum critical dimension may be defined as the diameter of the smallest cylinder which will accommodate a model of the molecule constructed using the best available values of bond distances, bond angles and Van der Waal's radii. Crystallographic pore diameter is defined as the free diameter of the approximate silicate ring in the zeolite structure, as calculated from X-ray diffraction analysis. Aluminosilicates which meet the above definition are those which have apparent pore size smaller than the critical dimension of the n-butane molecule. Practically, this defines suitable aluminosilicates as those capable of adsorption of $CO_2$ but incapable of adsorption of n-butane.

The aluminosilicates which can be employed in the catalyst systems of this invention have a crystalline structure and consist basically of a rigid three-dimensional framework of $SiO_4$ and $AlO_4$ tetrahedra in which the tetrahedra are cross-linked by the sharing of oxygen atoms whereby the ratio of the total aluminum and silicon atoms to oxygen atoms is 1 to 2. In their hydrated form the aluminosilicates may be represented by the following formula:

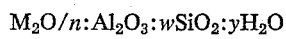

$$M_2O/n:Al_2O_3:wSiO_2:yH_2O$$

wherein M represents at least one ion of positive valence which balances the electrovalence of the tetrahedra; $n$ represents the valance of the ion; $w$ the moles of $SiO_2$ and $y$ the moles of $H_2O$. The ions of positive valance can be any one or more of a number of metal ions, hydrogen ions and ammonium ions, depending on whether the aluminosilicate is synthesized or occurs naturally. The ions of positive valance as well as the silicon, aluminum, and oxygen in the aluminosilicate are arranged in the form of a crystalline salt in a very definite and consistent crystalline pattern. The structure contains a large number of small cavities interconnected by a number of still smaller holes or channels. These cavities and channels are precisely uniform in size.

Aluminosilicates having a pore size of from about 3 to less than about 5 Angstrom units are well known in the art and include a wide variety of materials, both natural and synthetic. Among these materials are those capable of admitting molecules of carbon dioxide, carbon monoxide, oxygen, but having no sorption capacity for hydrocarbons of more than 3 carbon atoms in their molecule. Typical aluminosilicates which can be used would include certain forms of zeolite A, zeolite E, zeolite H, zeolite Q, zeolite R, zeolite S, zeolite W and zeolite Z, chabazite, gmelinite, stilbite, epi-stilbite, offretite, mordenite, and others. In some cases certain ionic forms of the zeolite are required. Usually, the alkali metal ionic form is the desired material having the smaller effective pore diameter. For example, the Na-form of zeolite A is known to exclude n-butane, in the sense required, while the Ca-form of the same zeolite does not. Also, while mordenite generally is said to be capable of admitting not only n-paraffins but even branched and cyclic molecules, the sodium form of mordenite is found to exclude these materials. Irregularities in the crystal structure of a specific zeolite specie can introduce variations in the effective permeability of molecules having sizes within the range of interest.

As has heretofore been stated, an essential feature of the process of this invention resides in associating materials having catalytic activity for the conversion of carbon monoxide to carbon dioxide within the pores of the shape-selective aluminosilicates. Materials having this catalytic activity are oxidation catalysts and are those metals commonly referred to as transition metals and include metals of Groups I–B, II–B, VI–B, VII–B and VIII of the Periodic Table as well as compounds thereof such as oxides and sulfides. Representative metals would include chromium, nickel, iron, molybdenum, cobalt, platinum, palladium, copper, zinc, etc.

The manner in which the transition metal is associated with the aluminosilicate is not critical and there are many techniques for accomplishing the same. Thus, the shape-selective aluminosilicate can be base exchanged with salt solutions containing the desired metal. Alternatively, the desired metal could be vaporized or sublimed onto the aluminosilicate. Another method for associating the catalyst within the pores of the aluminosilicate would be to incorporate a salt of the desired metal into the forming solution of the aluminosilicate and then grow the aluminosilicate crystals. It should be apparent that the transition metal or mixtures thereof can be present in the shape-selective aluminosilicate as ions, as elemental metals or as metal compounds and still be able to catalyze the oxidation of carbon monoxide to carbon dioxide.

The amount of catalyst present within the pores of the aluminosilicate will vary depending on its composition and state. It may constitute as much as 20 weight percent of the aluminosilicate, but may also be as low as or less than .01 weight percent. In fact, trace amounts of catalyst have been found to be quite effective for some catalytic materials, for example, platinum.

The particular conversion catalysts with which the transition metal-containing shape-selective aluminosilicate is admixed may include a wide variety of materials depending, of course, on the particular reaction which is to be catalyzed. In general, it can be stated that the process of this invention is operable with any and all solid, combustion-regenerable catalysts, i.e., catalysts which are customarily regenerated by burning. Typical conversion catalysts which may be admixed with the shape-selective aluminosilicate would include oxides such as silica, alumina, magnesia, zirconia, boria, silica-alumina, silica-magnesia, silica-zirconia, silica-boria, silica-titania, acid-treated clays, pumice and crystalline aluminosilicates having pore sizes greater than at least about 5 Angstrom units.

As has heretofore been set forth, the novel process of this invention is directed towards associating with a conversion catalyst an aluminosilicate having a pore size sufficiently large to admit carbon monoxide, oxygen and carbon dioxide, and sufficiently small to substantially exclude organic compounds and in particular, hydrocarbons, and having a transition metal within its internal pore structure. As regards the conversion catalyst per se, however, it should be noted that aluminosilicate materials having a pore size sufficiently large to admit organic compounds and particularly hydrocarbons, are very effective hydrocarbon conversion catalysts and therefore a very preferred embodiment of this invention would reside in admixing aluminosilicates having a pore size of at least 5 Angstrom units and more preferably between 6.8 and 13 Angstrom units, with the aforesaid shape-selective aluminosilicate having a pore size of from about 3 to less than about 5 Angstrom units.

Aluminosilicates having a pore size of at least about 5 Angstrom units include a wide variety of materials known in the art, such as zeolite 5A, zeolite T, zeolite X, zeolite Y, zeolite L, faujasite, chabazite, gmelinite, offretite, as well as zeolite alpha, ZK–4 and ZK–5. Zeolite alpha, ZK–4 and ZK–5 are described in U.S. Patent 3,140,253.

Although the majority of aluminosilicates usually occur naturally or are synthesized in the form of their alkali or alkaline earth metal salts, this invention also includes base exchanging the aluminosilicates having a pore size greater than 5 Angstrom units with a suitable solution in order to replace all or a portion of the alkali metal cations with other metal cations, hydrogen ions or ions capable of conversion to hydogen ions, e.g., ammonium ions, or mixtures of the same. It has been found that with regard to the aluminosilicate employed as a conversion catalyst, i.e., the aluminosilicate having a pore size greater than at least about 5 Angstrom units and more preferably greater than at least about 6.8 Angstrom units, a very definite relationship does exist between catalytic activity and the nature of the cations associated therewith. Thus, with regard to the aluminosilicates employed as a conversion catalyst, it is preferred that the aluminosilicate have at least 0.5 to 1.0, and more preferably 0.8 to 1.0, total equivalents of exchangeable cations per gram atom of aluminum. It has been found that aluminosilicates with a high degree of exchangeable cations give superior catalytic results. Secondly, it is preferred that the amount of alkali metal associated with these aluminosilicates be limited since the presence of alkali metals tends to suppress or limit catalytic properties, the activity of which as a general rule decreases with increasing content of alkali metal cations. Therefore, it is preferred that the aluminosilicate contain no more than 0.25 equivalent per gram atom of aluminum and more preferably no more than 0.15 equivalent per gram atom of aluminum, of alkali metal cations.

With regard to the metal cations associated with the aluminosilicate, the general order of preference is first cations of trivalent metals, followed by cations of divalent metals, with the least preferred being cations of monovalent metals. Of the trivalent metal cations the most preferred are rare earth metal cations, either individually or as mixtures of rare earth metal cations.

It is also particularly preferred to have at least some hydrogen associated with the aluminosilicate. Therefore, the most preferred class of aluminosilicates as conversion catalysts would be acid-metal aluminosilicates, or more particularly, acid-rare earth aluminosilicates wherein the metal would represent 40–85 percent of the total equivalents.

Additionally, it is preferred that the aluminosilicate employed as a conversion catalyst have an atomic ratio of silicon to aluminum of at least 1.5, preferably 1.8 and even more desirably at least 2.0.

The aluminosilicates containing the desired cations are prepared by treating a precursor aluminosilicate with a fluid medium, preferably an aqueous medium, containing a source of the desired cations, i.e., metal cations, hydrogen ions, ammonium ions, or mixtures thereof. In carrying out the treatment with the fluid medium, the procedure comprises contacting an aluminosilicate precursor with the desired fluid medium until such time as the metallic cations originally associated with the precursor material are replaced with the desired cations. Effective treatment with the fluid medium to obtain the desired aluminosilicate will vary with the duration of the treatment and the temperature at which it is carried out. In general, elevated temperatures tend to hasten the speed of treatment whereas the duration thereof varies inversely with the concentration of the cations in the fluid medium. It may be stated that the temperatures employed range from below ambient room temperature of 24° C. up to temperatures below the decomposition temperature of the aluminosilicate. Following the fluid treatment the treated aluminosilicate may be washed with water, preferably distilled or deionized water, until the effluent wash water has a pH of between 5 and 8. The aluminosilicate is thereafter dried and inactivated by heating in an inert atmosphere at temperatures ranging from about 400° F. to 1500° F. whereby ammonium ions, if present, undergo conversion to hydrogen ions.

As has heretofore been stated, control of the $CO_2/CO$ ratio is not only important for the purposes of controlling the after-burning phenomenon, but it is also important since it affects the amount of heat released by the coke burning operation for a given amount of carbon burned. The heat balance in a cyclic cracking operation with a conventionally normal $CO_2$ poor combustion product tends to be short of heat, when the amount of coke which is supplying heat by its regeneration drops substantially below 3 percent by weight based on the total charge. In view of the fact that exceptional cracking catalysts have been developed such as those set forth in U.S. 3,140,249; U.S. 3,140,251; U.S. 3,140,252; U.S. 3,140,253 and U.S. 3,210,267, and the fact that these catalysts tend to minimize coke formation, a situation can exist wherein an insufficient amount of heat results due to the fact that not enough coke is formed. According to this invention, the heat balance of a cracking operation can be uniquely aided by the combination with these new catalysts of a highly effective promoter for the conversion of essentially all CO to $CO_2$, this conversion being accomplished by additional heat of reaction.

As heretofore been pointed out, the novel process of this invention comprises using a catalyst mixture of at least two different components, one being a shape-selective aluminosilicate containing an oxidation catalyst in its internal pore structure and having a pore size such that it will admit carbon dioxide, oxygen and carbon monoxide and exclude organic compounds, and the other being a conversion catalyst. The catalyst composites of this invention may be prepared and used in different manners: They may be obtained merely by mechanically mixing the two components together. The catalyst composites may be used in the form of such mechanical mixtures, in static, moving, or fluidized type of reactors by mechanically mixing the two components. Alternatively, mixed composites of the aluminosilicate with the conversion catalyst may be pelleted, cast, molded, or otherwise formed into pieces of desired size and shapes, such as rods, spears, pellets, etc., it being preferred, however, that each of said pieces is composed of particles of both components.

The particle size of each individual component making up the catalyst system is not narrowly critical. It is also to be noted that each individual component in the catalyst system need not be of the same particle size. In one preferred embodiment of this invention they are of different particle size. This affords a means of ready separation of the catalyst components. In a catalytic cracking operation, for example, employing a moving bed of solid, the mixed solids may then be separated at will into components, and oxidation component may then be withdrawn as well as added to the circulating catalyst mass. In this manner the CO conversion percentage, and thus the degree of heat generation may be flexibly altered, as operating or charge stock variations may dictate for optimum operability.

As indicated previously, the catalyst mixture may be in the form of components which have been finely ground and mixed and pelleted so that each large particle contains particles of both components.

The particular proportion of one component to another in the catalyst system is also not narrowly critical and can vary over an extremely wide range. It will depend in part on the catalytic effectiveness of the oxidation catalyst chosen. However, it has been found that for most purposes the weight ratio of the shape-selective aluminosilicate to the conversion component can conveniently range from 1 to 1000 up to about 1 to 1, and preferably from 1 to 100 up to 1 to 5.

A preferred embodiment of this invention resides in the use of an aluminosilicate having a pore size greater than at least about 5 Angstrom units as a conversion catalyst and the use of a porous matrix as a binder therefor. Therefore, a preferred class of catalysts falling within the scope of this invention would include a system containing an aluminosilicate having a pore size of from about 3 to less than about 5 Angstrom units and an aluminosilicate having a pore size greater than about 5 Angstrom units and even more desirably greater than about 6.8 Angstrom units, which are combined, dispersed or otherwise intimately admixed with a porous matrix. It is to be understood that both aluminosilicates need not be mixed with the same matrix, but that each may be associated with separate solid matrix particles. Preferably, however, both aluminosilicates will be combined within the same matrix particle. In either case the resulting products will usually contain from 1 to 95 percent by weight, and preferably from 2 to 80 percent by weight of the aluminosilicates in the final composite.

The term "porous matrix" includes inorganic and organic compositions with which the aluminosilicates can be combined, dispersed or otherwise intimately admixed wherein the matrix may be active or inactive. It is to be understood that the porosity of the composition employed as a matrix can either be inherent in the particular material or it can be introduced by mechanical or chemical means. Representative matrices which can be employed include metals and alloys thereof, sintered metals and sintered glass, asbestos, silicon carbide aggregates, pumice, firebrick, diatomaceous earths, activated charcoal, and inorganic oxide gels. Of these matrices, the inorganic oxide gels are particularly preferred because of their superior porosity, attrition resistance, and stability under reaction conditions, especially those reaction conditions encountered in the cracking of gas oil.

The compositions containing an inorganic oxide gel can be prepared by several methods wherein the aluminosilicates are reduced to a particle size less than 40 microns, preferably within the range of 1 to 10 microns, and intimately admixed with an inorganic oxide gel while the latter is in a hydrous state such as in the form of hydrosol, hydrogel, wet gelatinous precipitate, or a mixture thereof. Thus, finely divided aluminosilicates can be mixed directly with a siliceous gel formed by hydrolyzing a basic solution of alkali metal silicate with an acid such as hydrochloric, sulfuric, acetic, etc. The mixing of the three components can be accomplished in any desired manner, such as in a ball mill or other types of kneading mills. The aluminosilicates also may be dispersed in a hydrosol obtained by reacting an alkali metal silicate with an acid or alkaline coagulant. The hydrosol is then permitted to set in mass to a hydrogel which is thereafter dried and broken into pieces of desired shape or dried by conventional spray drying techniques or dispersed through a nozzle into a bath of oil or other water-immiscible suspending medium to obtain spheroidally shaped "bead" particles of catalyst such as described in U.S. Patent 2,384,946. The aluminosilicate-siliceous gel thus obtained is washed free of soluble salts and thereafter dried and/or calcined as desired.

In a like manner, the aluminosilicates may be incorporated with an aluminiferous oxide. Such gels and hydrous oxides are well known in the art and may be prepared, for example, by adding ammonium hydroxide, ammonium carbonate, etc., to a salt of aluminum, such as aluminum chloride, aluminum sulfate, aluminum nitrate, etc., in an amount sufficient to form aluminum hydroxide which, upon drying, is converted to alumina. The aluminosilicate may be incorporated with the aluminiferous oxide while the latter is in the form of hydrosol, hydrogel, or wet gelatinous precipitate or hydrous oxide.

The inorganic oxide gel may also consist of a plural gel comprising a predominant amount of silica with one or more metals or oxides thereof selected from Groups II, III, IV and V of the Periodic Table. Particular preference is given to plural gels or silica with metal oxides of Groups II–A, III and IV–A of the Periodic Table, especially wherein the metal oxide is rare earth oxide, magnesia, alumina, zirconia, titania, beryllia, thoria, or combination thereof. The preparation of plural gels is well known and generally involves either separate precipitation or coprecipitation techniques, in which a suitable salt of the metal oxide is added to an alkali metal silicate and an acid or base, as required, is added to precipitate the corresponding oxide. The silica content of the siliceous gel matrix contemplated herein is generally within the range of 55 to 100 weight percent with the metal oxide content ranging from 0 to 45 percent. Minor amounts of promoters or other materials which may be present in the composition include cerium, chromium, cobalt, tungsten, uranium, platinum, lead, zinc, calcium, magnesium, barium, lithium, nickel and their compounds as well as silica, alumina, silica-alumina, or other siliceous oxide combinations as fines in amounts ranging from 0.5 to 40 percent by weight based on the finished catalyst.

The porous matrix may also consist of a semi-plastic or plastic clay material. The aluminosilicate can be incorporated into the clay simply by blending the two and fashioning the mixture into desired shapes. Suitable clays include attapulgite, kaolin, sepiolite, polygarskite, kaolinite, plastic ball clays, bentonite, montmorillonite, illite, chlorite, etc.

Other preferred matrices include powdered metals, such as aluminum, stainless steel, and powders of refractory oxides, such as $\alpha$ alumina, etc., having very low internal pore volume. Preferably, these materials have substantially no inherent catalytic activity of their own.

The catalyst product can be precalcined in an inert atmosphere near the temperature contemplated for conversion but may be calcined initially during use in the conversion process. Generally, the catalyst is dried between 150° F. and 600° F. and thereafter calcined in air or an inert atmosphere of nitrogen, helium, flue gas or other inert gas at temperatures ranging from about 500° F. to 1500° F. for periods of time ranging from 1 to 48 hours or more. It is to be understood that the aluminosilicate can also be calcined prior to incorporation into the inorganic oxide gel.

The catalysts prepared in accordance with the invention find extensive utility in a wide variety of hydrocarbon conversion processes including cracking, isomerization, dealkylation, alkylation, disproportionation, hydration of olefins, amination of olefins, dehydration of alcohols, polymerization, etc. The catalysts are exceptionally stable and are particularly useful in such of the above and related processes carried out at temperatures ranging from ambient temperatures of 70° F. up to 1400° F. Because of their high catalytic activities, the catalysts are especially useful for effecting various hydrocarbon conversion processes such as alkylation, for example, at relatively low temperatures with small amounts of catalyst, thus providing a minimum of undesirable side reactions and operating costs.

By way of example, cracking operations carried out with the catalysts prepared in accordance with the invention may be effected at temperatures ranging from about 300° F. to 1300° F. under reduced, atmospheric or super-atmospheric pressure. The catalyst can be utilized in the form of spheroidal particles or beads dispersed in a stationary bed or in the fluid procedures wherein the catalyst is dispersed in a reaction zone to which catalyst is continuously added and from which catalyst is continuously removed. Particularly effective cracking processes can be achieved when the catalyst is used to obtain the inherent advantages realized in moving bed techniques such as the Thermofor Catalytic Cracking Process as well as in fluidized cracking processes.

The catalysts of the invention may be further utilized for the alkylation of aromatic hydrocarbons or phenols and the conversion of olefinic, acetylenic and naphthenic hydrocarbons. Alkylation of aromatics and phenols may be carried out at temperatures between 15° F. and 850° F. under pressures of 0 to 1000 p.s.i.g. Other reactions in which the catalysts find utility include isomerization, polymerization, hydrogen transfer, oxidation of olefins to form the corresponding oxide, such as butene to butene oxide, etc., as well as the oxidation of alcohol and ketones, etc.

The following examples will illustrate the best mode now contemplated for carrying out the invention.

Example 1

This example will illustrate a typical preparation of a shape-selective crystalline aluminosilicate containing platinum in its internal pore structure.

A platinum-containing crystalline aluminosilicate having a high degree of crystallinity was prepared by admixing the following solutions:

(A) 92 grams of sodium aluminate (containing 41.3 weight percent $Al_2O_3$ and 35.4 weight percent $Na_2O$) and 0.8 gram of tetrammine platinous chloride ($Pt(NH_3)_4Cl_2$) dissolved in 400 ml. of distilled water at room temperature, filtered and 1 ml. of concentrated ammonium hydroxide added to the filtrate.

(B) 120 grams of sodium metasilicate $$(Na_2SiO_3 \cdot 9H_2O)$$

(containing 21 weight percent $SiO_2$ and 22.9 weight percent $Na_2O$) dissolved in 400 ml. of distilled water at room temperature.

Solutions A and B are poured simultaneously with stirring into a 1500 ml. beaker at room temperature to form a white voluminous and gelatinous solid. The solid gel is next placed on a water bath and heated with stirring for two hours at about 95° C. with the addition of hot distilled water to maintain constant solution volume. At the end of two hours, the reaction mixture is heated to a temperature of about 100° C. to 102° C. and stirring is continued for another 3 hours.

Sixty grams of crystalline platinum containing aluminosilicate after decantation from its mother liquor were slurried in 150 ml. wash solution containing 150 grams sodium chloride, 2.5 grams sodium aluminate, 2.9 grams sodium metasilicate and 2 ml. of concentrated ammonium hydroxide in 1000 ml. of water (pH 10.7). The aluminosilicate was stirred in the wash solution, allowed to stand for 30 minutes and then filtered. At this point, the entire washing procedure was repeated three additional times. The catalyst was then air dried at 105° C. and calcined in air at 450° C. for one hour.

Example 2

Three materials were prepared as follows:

*Catalyst A.*—This material was prepared according to the general procedure of Example 1 and analyzed 0.009 weight percent platinum.

*Catalyst B.*—This material was prepared according to the general procedure of Example 1 with the exception that chloroplatinic acid was present in the forming solution in place of tetrammine platinous chloride. This material analyzed 0.011 weight percent platinum.

*Catalyst C.*—This material was prepared in accordance with Example 1 except that no platinum salt was used.

Due to the fact that cracking catalysts are exposed to temperatures greater than 1000° F. during regeneration cycles, Catalysts A, B and C were heated in air at 1300° F. to stabilize their properties (20 hours for A and C and 80 hours for B) and then evaluated for oxidation activity by mixing 0.05 gram of each catalyst with 0.1 ml. of 20/30 mesh Vycor chips and placing the mixture in a microreactor. The mixture was purged with air at 900° F. for one hour and then cooled to 800° F. A 2 percent by volume mixture of carbon monoxide and air was then passed over the catalyst at a flow rate of 100 ml./minute and samples analyzed at intervals by gas chromatographic techniques. The experiments were repeated at various temperatures and the results obtained are shown in the following table:

TABLE

| Catalyst | Temperature, ° F. | Percent Conversion |
|---|---|---|
| A | 800 | 86 |
| A | 900 | 97 |
| A | 1,000 | 100 |
| B | 800 | 69 |
| B | 900 | 88 |
| B | 1,000 | 100 |
| C | 800 | 0 |
| C | 900 | 0 |
| C | 1,000 | <1 |

The above results show the necessity of having a transition metal in the pores of the shape-selective aluminosilicate.

Example 3

This example will illustrate that the shape-selective aluminosilicate exerts substantially no catalytic activity towards hydrocarbons having more than 3 carbon atoms in their structure.

A mixture containing 0.5 percent n-butane in air was passed over Catalysts A and B at 900° F. with the following results:

TABLE

Catalyst: Percent conversion of n-butane
  A, Fresh _____ <1.5
  A, 16 hr. air treat at 1300° F. _____ <4.5
  B, Fresh _____ <1.0
  B, 16 hr. air treat at 1300° F. _____ <2.0

From the above table it can be seen that materials which possessed high catalyst activity for carbon monoxide oxidation were essentially inaccessible and inert as regards organic conversion.

What is claimed is:

1. In a process for the continuous catalytic conversion of an organic charge wherein said charge is contacted with a solid combustion-regenerable conversion catalyst in a conversion zone so as to effect conversion of said organic charge with concomitant deposition on said conversion catalyst of a combustible contaminating deposit and thereafter passing said conversion catalyst through a regeneration zone in order to burn off said combustible deposit thereby forming carbon dioxide and carbon monoxide, the improvement which comprises admixing with said solid combustion-regenerable conversion catalyst a shape-selective crystalline aluminosilicate having a pore size of from about 3 to less than about 5 Angstrom units containing an oxidation catalyst within its internal pore structure and having a pore size such that carbon dioxide, carbon monoxide and oxygen will be admitted into the interior pore structure thereof and sufficiently small to substantially exclude n-butane so as to control the ratio of carbon dioxide to carbon monoxide formed in said regeneration zone.

2. The process of claim 1 wherein said oxidation catalyst is selected from the group consisting of Group I-B, II-B, VI-B, VII-B and VIII metals and compounds thereof.

3. The process of claim 1 wherein said solid combustion-regenerable conversion catalyst comprises an aluminosilicate having a pore size of at least 10 Angstrom units.

4. In a process for the continuous catalytic cracking of a hydrocarbon charge wherein said hydrocarbon charge is contacted with a solid combustion-regenerable conversion catalyst in a conversion zone so as to effect cracking of said hydrocarbon charge with concomitant deposition on said conversion catalyst of a combustible contaminating deposit and thereafter passing said cracking catalyst through a regeneration zone in order to burn off said combustible deposit thereby forming carbon dioxide and carbon monoxide, the improvement which comprises admixing with said solid combustion-regenerable cracking catalyst a shape-selective crystalline aluminosilicate having a pore size of from about 3 to less than about 5 Angstrom units containing an oxidation catalyst selected from the group consisting of Group I-B, II-B, VI-B and VIII metals and compounds thereof within its internal pore structure and having a pore size such that carbon dioxide, carbon monoxide and oxygen will be admitted to the interior pore structure thereof, and sufficiently small to substantially exclude n-butane so as to control the ratio of carbon dioxide to carbon monoxide formed in said regeneration zone.

5. The process of claim 4 wherein said cracking catalyst comprises a crystalline aluminosilicate having a pore size of about 13 Angstrom units and having no more than 0.25 equivalent per gram atom of aluminum of alkali metal cations associated therewith.

References Cited

UNITED STATES PATENTS

| | | | |
|---|---|---|---|
| 2,962,435 | 11/1960 | Fleck et al. | 208—119 |
| 3,140,249 | 7/1964 | Plank et al. | 208—120 |
| 3,238,123 | 3/1966 | Voorhies et al. | 208—264 |

OTHER REFERENCES

Molecular Sieves by Charles K. Hersh, pp. 29 and 30, Reinhold Pub. Co., New York, 1961.

ABRAHAM RIMENS, *Primary Examiner.*

DELBERT E. GANTZ, *Examiner.*